United States Patent
DesJardins et al.

(10) Patent No.: US 7,072,999 B1
(45) Date of Patent: Jul. 4, 2006

(54) ROBUST PACKET ARRIVAL TIME DETECTOR USING ESTIMATED SIGNAL POWER

(75) Inventors: Philip DesJardins, Nevada City, CA (US); Scott A. Lery, Nevada City, CA (US); Carl Alelyunas, Nevada City, CA (US)

(73) Assignee: 2Wire, Inc., San Jose, CA (US)

( * ) Notice: Subject to any disclaimer, the term of this patent is extended or adjusted under 35 U.S.C. 154(b) by 6 days.

(21) Appl. No.: 09/893,101

(22) Filed: Jun. 26, 2001

Related U.S. Application Data

(60) Provisional application No. 60/214,603, filed on Jun. 27, 2000.

(51) Int. Cl.
*G06F 3/00* (2006.01)

(52) U.S. Cl. .................. 710/58; 710/60; 710/117; 713/300; 713/310; 713/330; 713/500; 713/502; 713/600; 375/200; 370/535

(58) Field of Classification Search ............... 713/300, 713/330, 310, 600, 500, 502; 375/200; 370/535; 710/58, 60, 117, 61
See application file for complete search history.

(56) References Cited

U.S. PATENT DOCUMENTS

| | | | |
|---|---|---|---|
| 5,025,457 A | * | 6/1991 | Ahmed ....................... 375/106 |
| 5,247,464 A | | 9/1993 | Curtis |
| 5,381,407 A | | 1/1995 | Chao |
| 5,566,180 A | * | 10/1996 | Eidson et al. ............... 370/94.2 |
| 5,659,573 A | * | 8/1997 | Bruckert et al. ............. 375/200 |
| 5,799,011 A | * | 8/1998 | LaRosa et al. ............... 370/335 |
| 5,802,106 A | | 9/1998 | Packer |
| 5,966,387 A | | 10/1999 | Cloutier |
| 6,069,902 A | * | 5/2000 | Kurano et al. ............... 370/535 |
| 6,091,742 A | | 7/2000 | Bassat et al. |
| 6,305,233 B1 | * | 10/2001 | Braathen et al. ........... 73/861.28 |
| 6,347,091 B1 | * | 2/2002 | Wallentin et al. ........... 370/437 |
| 6,580,694 B1 | | 6/2003 | Baker |
| 6,687,752 B1 | | 2/2004 | Falco et al. |
| 6,690,683 B1 | | 2/2004 | Brunheroto et al. |
| 6,724,726 B1 | | 4/2004 | Coudreuse |

* cited by examiner

*Primary Examiner*—Jeffrey Gaffin
*Assistant Examiner*—Justin Knapp
(74) *Attorney, Agent, or Firm*—Blakely, Sokoloff, Taylor & Zafman LLP

(57) ABSTRACT

A robust packet arrival time detector using a power estimate to validate a packet arrival time measurement. A packet arrival time measurement is considered valid when the value of the power estimate signal indicates that a packet is being received. A power estimator comprises a bandpass filter, a Hilbert transform, two squaring devices, an adder, and a lowpass filter.

30 Claims, 9 Drawing Sheets

ROBUST PACKET ARRIVAL TIME DETECTOR USING ESTIMATED SIGNAL POWER

CROSS-REFERENCE TO RELATED APPLICATIONS

This application is related to, and claims the benefit of, U.S. Provisional Patent Application No. 60/214,603, entitled "Robust Packet Arrival Time Detector Using Estimated Signal Power," filed Jun. 27, 2000. This application is also related to U.S. patent application Ser. No. 09/887,233 entitled "Apparatus and Method for Detecting Packet Arrival Time," filed Jun. 21, 2001. The subject matter of the related applications are hereby incorporated by reference. The related applications are commonly assigned.

BACKGROUND OF THE INVENTION

1. Field of the Invention

This invention relates generally to computer networking devices and more particularly to a robust packet arrival time detector using estimated signal power.

2. Description of the Background Art

Digital communication systems that communicate over a shared medium transmit information organized into discrete packets. To recover the information, a receiver must be able to determine when packets arrive, and to distinguish packets from noise. In general, the receiver must determine a Packet Arrival Time (PAT) for each received packet, since the packets might be transmitted from different asynchronous sources. The PAT is commonly used by sections of the receiver to prepare for the onset of the information-bearing portion of the packet. For example, an equalizer can use the PAT as an indicator of when to start training. In this situation, the more accurate the PAT, the faster the equalizer will converge before the onset of information, which makes the receiver less prone to packet errors.

A packet arrival time detector can be characterized by its detection and false alarm probabilities. These probabilities are dependent upon the value of a threshold for detection set by a designer of the detector. For example, a low value for the threshold increases the detection probability, but also increases the probability of a false alarm (false detection). Decreasing the sensitivity of the false alarm probability to the value of the threshold is a significant consideration of designers and manufacturers of digital communication systems.

SUMMARY OF THE INVENTION

In accordance with the invention, a system and method are disclosed to implement a robust packet arrival time detector using estimated signal power in a receiver. The system of the invention includes a packet arrival time detector configured to detect arrival time of packets and a power estimator configured to provide an estimate of the power of a received signal to the packet arrival time detector. When the estimated power reaches a level that indicates that a packet is being received, the packet arrival time detector output is valid.

An embodiment of the power estimator includes a bandpass filter, a Hilbert transform, two squaring devices, an adder, and a lowpass filter. The bandpass filter filters the received signal and provides the filtered signal to the Hilbert transform. The Hilbert transform outputs the delayed received signal as the real component of an analytic signal and outputs the quadrature signal of the received signal as the imaginary component of the analytic signal. The quadrature signal is the Hilbert transform of the received signal. The squaring devices square the real and imaginary components of the analytic signal. The adder sums the two squared signals and provides the sum to the lowpass filter, which filters the sum and outputs the filtered sum as the power estimate.

While no packets are being received by the receiver, the output of the power estimator is a measure of ambient noise power, where the ambient noise may include narrow band interference and additive white Gaussian noise (AWGN). When a packet is being received by the receiver, the output of the power estimator increase significantly, which is easily detected by the packet arrival time detector. The number of samples during which the power estimate remains approximately at the same level defines a "window" where the output of the packet arrival time detector is considered valid.

DETAILED DESCRIPTION OF THE DRAWINGS

Figure 1:
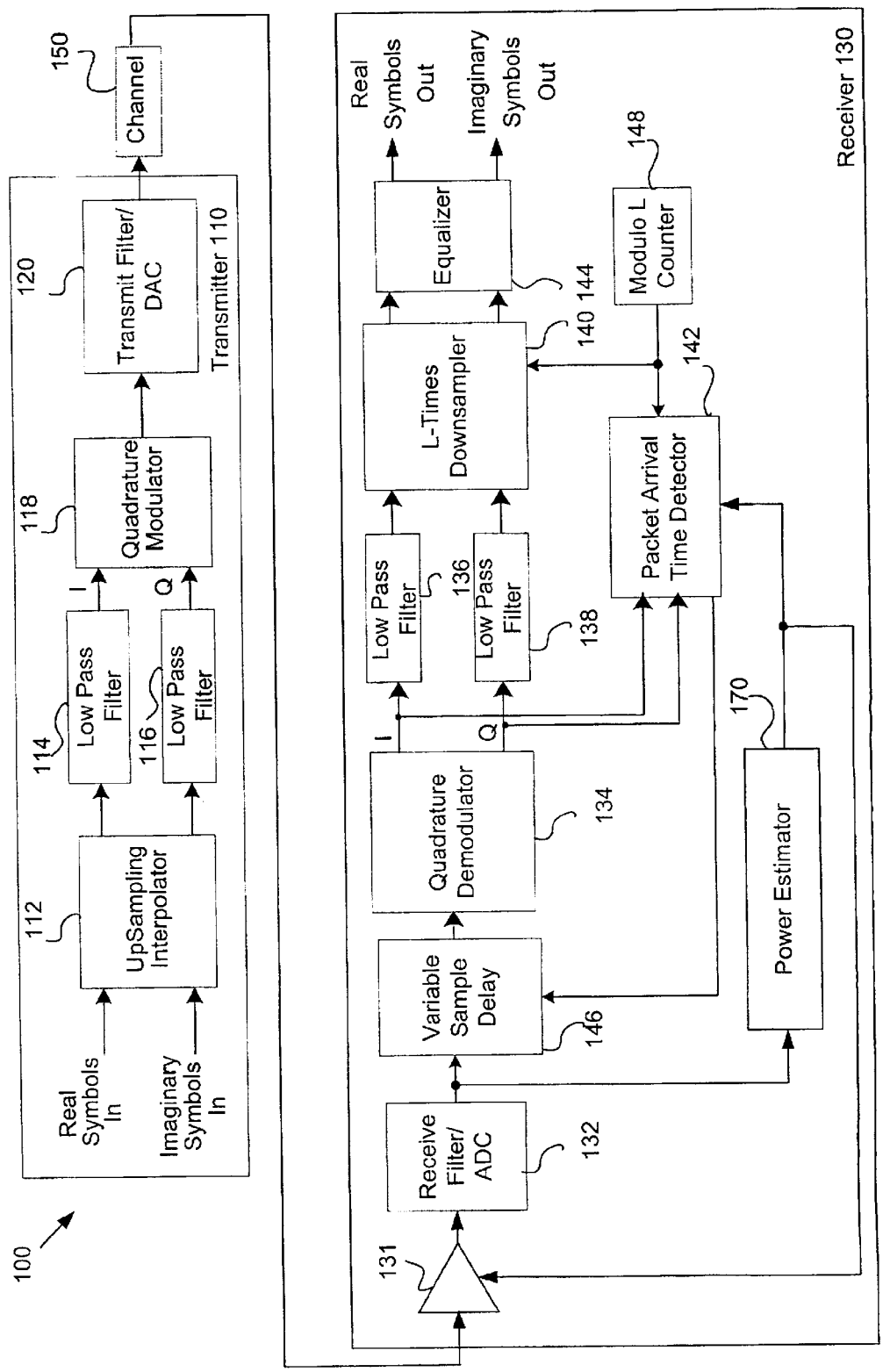
FIG. 1 is a block diagram of one embodiment of a communication system including a receiver that incorporates a Packet Arrival Time Detector, in accordance with the invention.

FIG. 1 is a block diagram of one embodiment of a communication system 100 including a receiver configured to detect a packet arrival time, in accordance with the invention. Communication system 100 includes a transmitter 110 (such as an HPNA transmitter) for transmitting information in discrete packets, a receiver 130 (such as an HPNA receiver) for receiving the packets from the transmitter 110, and a channel 150 for communicatively connecting transmitter 110 with receiver 130.

Transmitter 110 includes, but is not limited to, an up-sampling interpolator 112, two low pass filters 114 and 116, a quadrature modulator 118, and a transmit filter/DAC (Digital-to-Analog-Converter) 120. The information in a packet is represented as a sequence of symbols. To facilitate determining the arrival time of a packet, a sequence of known symbols called a "preamble" is added in front of the information portion of the packet. For example, in one embodiment of an HPNA packet, the preamble is the first 64 symbols of the packet. The size and contents of the preamble are specified in the HPNA specifications, for example "Interface Specification for HomePNA 2.02.7 10M8 Technology" by Home Phoneline Networking Alliance, hereby incorporated by reference.

A complex encoder (not shown) encodes the bits of a packet, including the preamble, as complex symbols, including real symbols (i.e., an in-phase component) and imaginary symbols (i.e., a quadrature component). Therefore, the input signals at up-sampling interpolator 112 consist of two components, namely, real symbols and imaginary symbols. Up-sampling interpolator 112 increases the sampling rate of the input symbols by interpolating new samples between each adjacent sample in the input symbols, producing up-sampled real samples and up-sampled imaginary samples. Low pass filters 114 and 116 perform pulse shaping over the up-sampled real samples and up-sampled imaginary samples, respectively.

Upon receiving the filtered real and imaginary samples from low pass filters 114 and 116, quadrature modulator 118 performs bandpass modulation to convert the filtered real and imaginary samples to a signal that is compatible with the transmission requirements imposed by channel 150. Since the real and imaginary samples are orthogonal to each other, quadrature modulator 118 modulates these two sample streams into one signal. Specifically, quadrature modulator 118 modulates the real samples with a $\cos \omega_0 t$ signal, and the imaginary samples with a $(-\sin \omega_0 t)$ signal. Quadrature modulator 118 then combines these two modulated signals into one signal stream. Since the modulated signal generated by quadrature modulator 118 is a digital signal, transmit filter/DAC 120 converts it into an analog signal and then performs pulse shaping over the analog signal to ensure that the transmission bandwidth of the analog signal is contained within a desired spectral region. Finally, transmitter 110 sends the analog signal to receiver 130 through channel 150. Channel 150 typically affects the quality of the transmitted signal, introducing narrow band interference and additive white Gaussian noise (AWGN).

Receiver 130 includes an automatic gain control (AGC) amplifier 131, a receive filter/ADC (Analog-to-Digital-Converter) 132, a variable sample delay 146, a quadrature demodulator 134, two low pass filters 136 and 138, an L-times downsampler 140, an equalizer 144, a modulo L counter 148, a packet arrival time detector 142, and a power estimator 170. Upon receiving the analog signal from channel 150, AGC amplifier 131 amplifies the analog signal by a gain controlled by the output of power estimator 170. Receive filter/ADC 132 removes unwanted high frequency signals from the analog signal and then converts the analog signal to digital samples at a sampling rate that matches the sampling rate of transmitter 110. Variable sample delay 146 delays the sampled signal a variable number of samples from 0 to L-1, where L is the ratio of the sample rate to the symbol rate. Specifically, the delay that variable sample delay 146 provides is set by a packet arrival time signal sent from packet arrival time detector 142. In an alternate embodiment of receiver 130, the packet arrival time signal from packet arrival time detector 142 is input to equalizer 144. One embodiment of packet arrival time detector 142 is disclosed in the related co-pending application entitled "Apparatus and Method for Packet Arrival Time Detection."

Quadrature demodulator 134 removes the carrier signal from the received signal and generates the real and imaginary (in-phase and quadrature) components of the recovered signal. Low pass filters 136 and 138 filter the recovered real and imaginary samples, respectively. L-times down-sampler 140 then down-samples the complex samples to produce recovered real and imaginary symbols, where the ratio of samples to symbols is L. L-times downsampler 140 outputs a complex signal to equalizer 144 whenever the value of modulo L counter 148 is zero; if equalizer 144 is fractionally-spaced, L-times downsampler 140 may output intermediate complex samples, but a symbol boundary is determined when the value of modulo L counter 148 is zero. Modulo L counter 148 is a free running modulo-L sample counter that is initially set to zero when receiver 130 is first powered up. The value of modulo L counter 148 is also input to packet arrival time detector 142 for use in determining the timing of the sample of maximum correlation relative to a symbol boundary.

Due to bandwidth limitations, channel 150 may cause amplitude or phase distortions in the transmitted analog signal. Such distortions can produce inter-symbol interference (ISI), where the pulses in the recovered baseband signal overlap or "smear" with each other. Equalizer 144 eliminates or reduces ISI in the recovered baseband signal.

Power estimator 170 receives samples from receive filter/ADC 132 and calculates a power estimate of the received signal. Power estimator 170 provides the power estimate to AGC amplifier 131 and to packet arrival time detector 142. Packet arrival time detector 142 uses the power estimate as a "search window" for validating detections of packet arrival, which makes packet arrival time detector 142 less sensitive to false alarms. The power estimate output of power estimator 170 is an enable signal that validates the output of packet arrival time detector 142.

Figure 2:
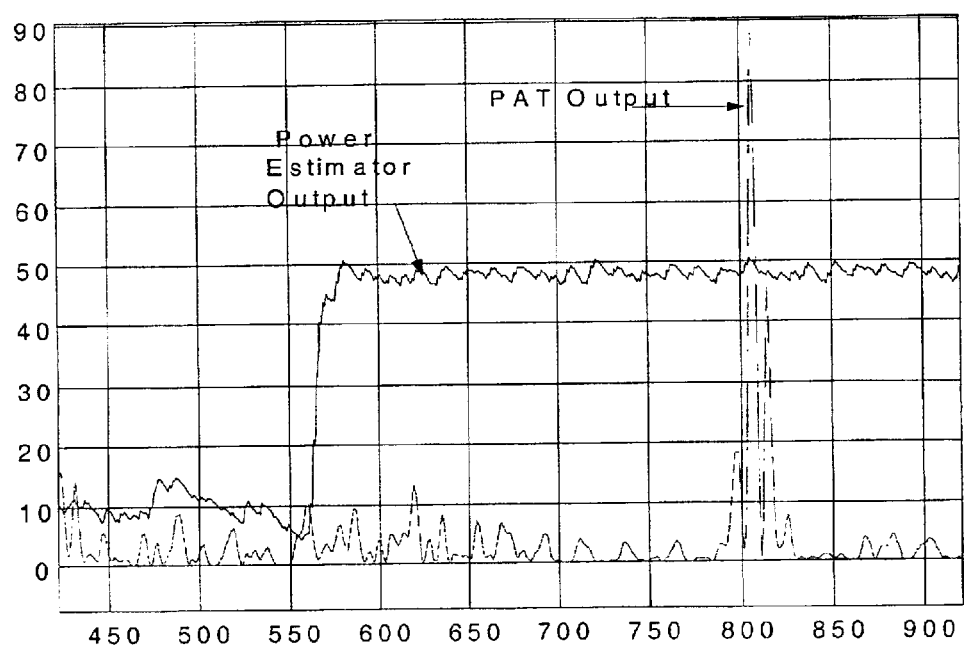
FIG. 2 is a diagram showing a power estimator output and a packet arrival time detector output.

FIG. 2 is a diagram showing an output of power estimator 170 and an output of packet arrival time detector 142. The horizontal axis represents time (in samples) and the vertical axis represents power in decibels (dB). As shown in FIG. 2, the output of packet arrival time detector 142 reaches a global maximum when the entire preamble of a packet has arrived, at approximately 810 samples. The output of packet arrival time detector 142 also has many local maximums, which may be detected falsely as an indication that the entire preamble has arrived.

The power estimate output shown in FIG. 2 was generated by an embodiment of power estimator 170 that simply squares the received samples to produce a power estimate. The output of power estimator 170 is initially an ambient noise power measurement, which is taken when packets are not being received. The ambient noise power measurement establishes a power reference level, $P_o$, which is input to AGC amplifier 131 (FIG. 1). When a packet is being received by receiver 130, the output of power estimator 170 increases sharply. In FIG. 2, the output of power estimator 170 increases sharply at around 560–565 samples, where the output of power estimator 170, Pest, is greater than the reference level $P_o$ by an amount corresponding to a minimum signal-to-noise ratio (SNR) required to properly decode a packet encoded at the lowest possible data rate, which signifies the arrival of a packet. However, since the maximum of the output of packet arrival time detector 142 does not occur until the entire preamble has arrived, consideration of the output of packet arrival time detector by receiver 130 can be deferred several sample times to lower the probability of a false alarm. Packet arrival time detector 142 ignores the values it calculates for packet arrival time until the output of power estimator 170 indicates that a packet is being received.

Figure 3A:
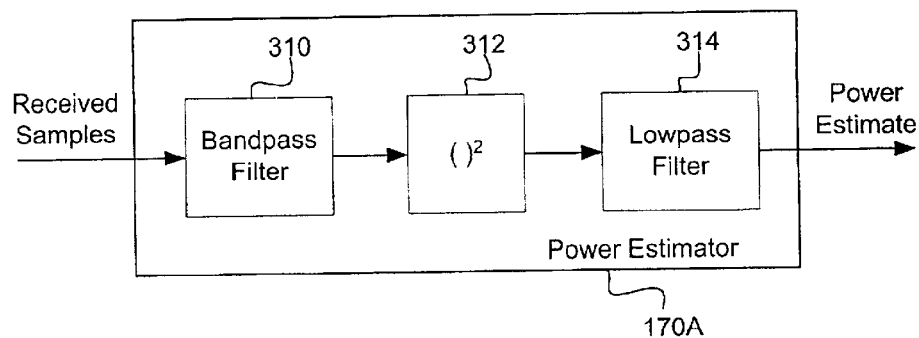
FIG. 3A is a block diagram of one embodiment of the power estimator of FIG. 1, in accordance with the invention.

FIG. 3A is a block diagram of one embodiment of power estimator 170A of FIG. 1. In this embodiment, power estimator 170A includes a bandpass filter 310, a squaring device 312, and a lowpass filter 314. Power estimator 170A receives samples from receive filter/ADC 132. Bandpass filter 310 filters the samples and inputs the filtered samples to squaring device 312, which squares the filtered samples to produce squared samples. Lowpass filter 314 filters the squared samples to produce a power estimate that is output to packet arrival time detector 142.

Figure 3B:
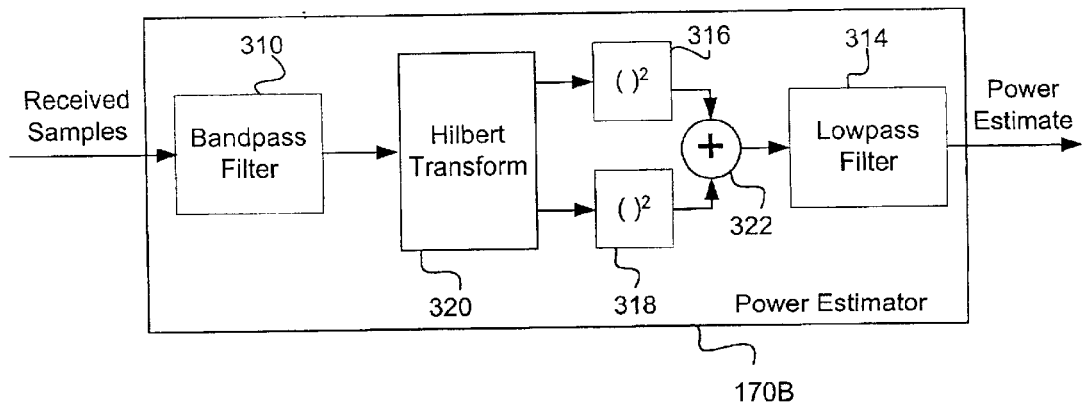
FIG. 3B is a block diagram of another embodiment of the power estimator of FIG. 1, in accordance with the invention.

FIG. 3B is a block diagram of one embodiment of power estimator 170B of FIG. 1, according to the invention. Power estimator 170B includes bandpass filter 310, a Hilbert transform 320, two squaring devices 316 and 318, an adder 322, and lowpass filter 314. Bandpass filter 310 receives samples from receive filter/ADC 132 and filters the samples. Hilbert transform 320 operates on the filtered samples to produce an analytic signal including real samples and imaginary samples. An analytic signal consists of a real part that is the same as the original signal and an imaginary part that is the Hilbert transform of the original signal. The imaginary part of the analytic signal is 90 degrees out of phase with the original signal. The contents and functionality of Hilbert transform 320 are discussed below in conjunction with FIG. 5. Squaring device 316 squares the transformed real samples and squaring device 318 squares the transformed imaginary samples. Adder 322 sums together the real and imaginary samples and inputs the sum to lowpass filter 314. Lowpass filter 314 filters the sum to produce a power estimate and outputs the power estimate to packet arrival time detector 142.

Figure 4:
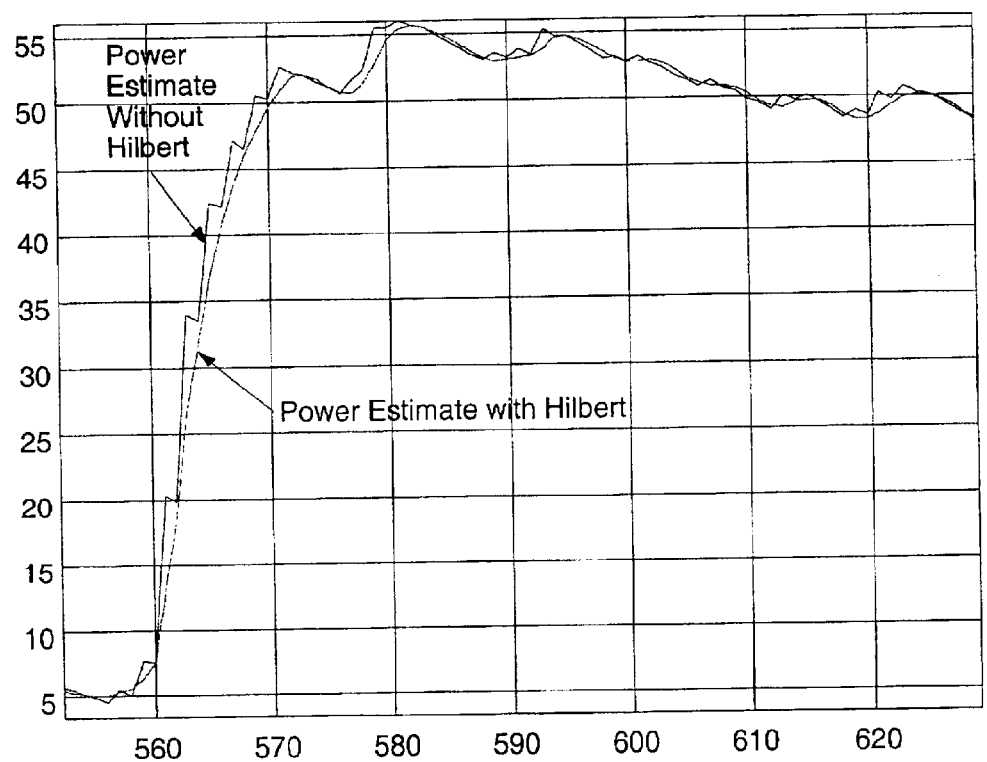
FIG. 4 is a diagram showing a power estimate output of the power estimator of FIG. 3A and a power estimate output of the power estimator of FIG. 3B.

FIG. 4 is a diagram showing a power estimate output of the power estimator 170A of FIG. 3A and a power estimate output of the power estimator 170B of FIG. 3B. The horizontal axis represents time (in samples) and the vertical axis represents power in dB. As shown in FIG. 4, the power estimate of power estimator 170B using Hilbert transform 320 is much smoother and more accurate than the power estimate output of power estimator 170A using squaring device 312.

Figure 5:
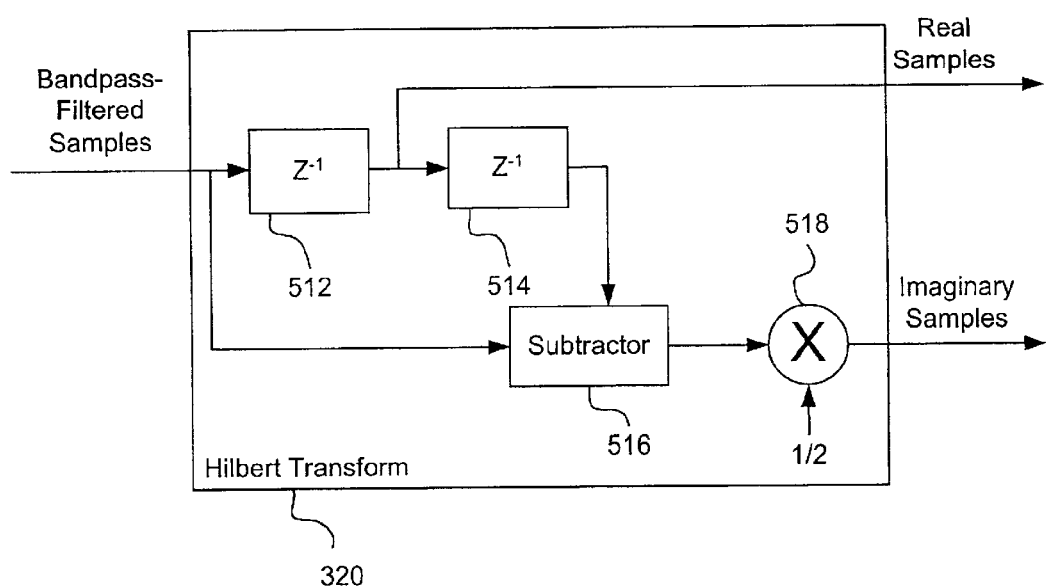
FIG. 5 is a block diagram of one embodiment of the Hilbert transform of FIG. 3B, in accordance with the invention.

FIG. 5 is a block diagram of one embodiment of Hilbert transform 320 of FIG. 3B, in accordance with the invention. Hilbert transform 320 includes, but is not limited to, two delay elements 512 and 514, a subtractor 516, and a multiplier 518. Bandpass-filtered samples from bandpass filter 310 are input to delay element 512 and to subtractor 516. Delay element 512 delays the samples one sample time and outputs the delayed samples as real samples. Delay element 512 also outputs the delayed samples to delay element 514, which delays the samples a further sample time. Subtractor 516 subtracts the samples from bandpass filter 310 from the twice-delayed samples from delay element 514. Subtractor 516 outputs the difference to multiplier 518 which multiplies the difference by one-half to produce imaginary samples. The real samples and the imaginary samples are input to squaring devices 316 and 318 respectively. As described above in conjunction with FIG. 3B, Hilbert transform 320 produces a real output that is equal to its input delayed by one sample, and an imaginary output that is the quadature function of its input.

Figure 6:
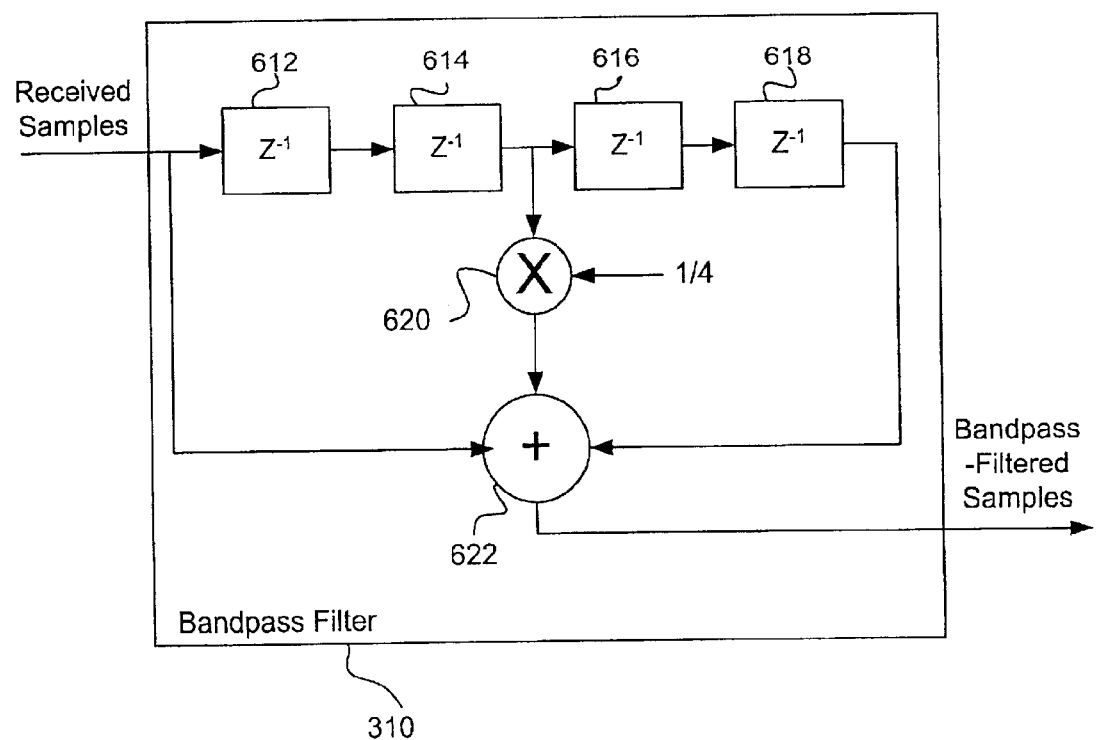
FIG. 6 is a block diagram of one embodiment of the bandpass filter of FIG. 3B, in accordance with the invention.

FIG. 6 is a block diagram of one embodiment of bandpass filter 310 of FIG. 3B, in accordance with the invention. Bandpass filter 310 includes, but is not limited to, four delay elements 612, 614, 616, and 618, a multiplier 620, and an adder 622. Bandpass filter 310 receives samples from receive filter/ADC 132 and delays the samples with delay elements 612, 614, 616, and 618. Twice-delayed samples from delay element 614 are input to multiplier 620, which multiplies the twice-delayed samples by a coefficient equal to one-quarter. In the preferred embodiment, multiplier 620 is not implemented as a physical multiplier since multiplying by one-quarter can be implemented by a shift function.

The shape of the frequency response of bandpass filter 310 adds selectivity to the power estimate produced by power estimator 170. When receiver 130 operates in an environment containing strong narrow band interference, the frequency response of bandpass filter 310 has notches at frequencies where narrow band interference is present. In the FIG. 6 embodiment, the frequency response of bandpass filter 310 has notches at 4 MHz and 10 MHz. Thus, power estimator 170 is insensitive to the narrow band interference but is still sensitive to the desired signal transmitted by transmitter 110, and the output of power estimator 170 steps up upon the arrival of a packet. If the frequency response of bandpass filter 310 did not have these notches, power estimator 170 would be insensitive to the arrival of a packet in the presence of strong narrow band interference, for example when a signal-to-interference ratio is 5 dB.

Figure 7A:
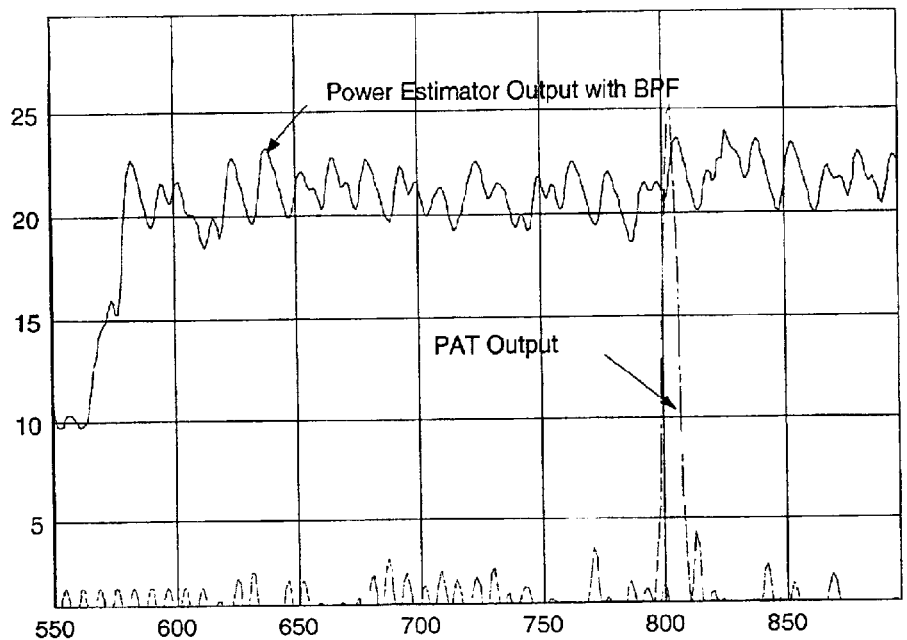
FIG. 7A is a diagram showing a power estimate output of the power estimator of FIG. 3B.
Figure 7B:
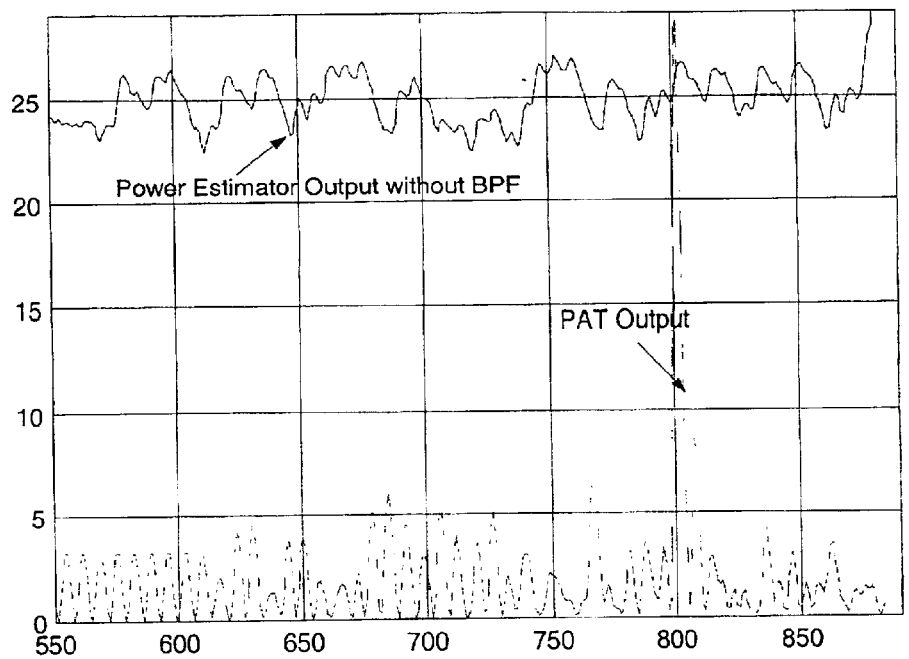
FIG. 7B is a diagram showing a power estimate output of a power estimator without a bandpass filter.

FIG. 7A is a diagram of the output of power estimator 170B of FIG. 3B, and FIG. 7B is a diagram of an output of an embodiment of power estimator 170 without a bandpass filter. In these figures, a tone at 10 MHz added to an HPNA (Home Phoneline Networking Alliance) 2.0 signal centered at 7 MHz with a bandwidth of 6 MHz was input to two embodiments of receiver 130, one embodiment having power estimator 170B and the other embodiment having a power estimator without bandpass filter 310. The signal-to-interference ratio between the HPNA signal and the 10 MHz tone was 5 dB. As shown in FIG. 7A the output of power estimator 170B exhibits a significant increase when a packet arrives at approximately 560–580 samples. In contrast, the power estimator output shown in FIG. 7B shows no significant increase when a packet arrives at approximately 560–580 samples.

Figure 8:
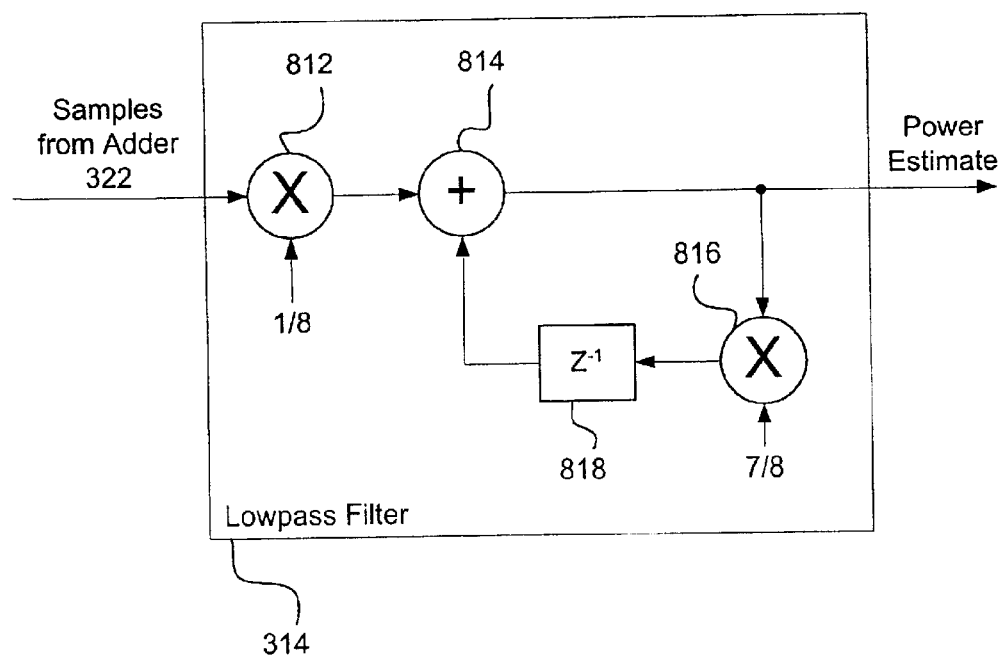
FIG. 8 is a block diagram of one embodiment of the lowpass filter of FIG. 3B, in accordance with the invention.

FIG. 8 is a block diagram of one embodiment of lowpass filter 314 of FIG. 3B, in accordance with the invention. Lowpass filter 314 includes, but is not limited to, a multiplier 812, an adder 814, a multiplier 816, and a delay element 818. Multiplier 812 multiplies samples from adder 322 (FIG. 3B) by a coefficient equal to one-eighth. Adder 814 sums the product from multiplier 812 with the output of delay element 818. Lowpass filter 314 outputs this sum as the power estimate. Multiplier 816 multiplies the sum from adder 814 by a coefficient equal to seven-eighths and sends the product to delay element 818, which delays the product by one sample.

Lowpass filter 314 smoothes the signal from adder 322 to produce a smooth power estimate output of power estimator 170. The FIG. 8 embodiment of lowpass filter 314 has a low complexity implementation, and due to the choice of coefficients, multipliers 812 and 816 may be implemented as shift-and-add operations.

Figure 9:
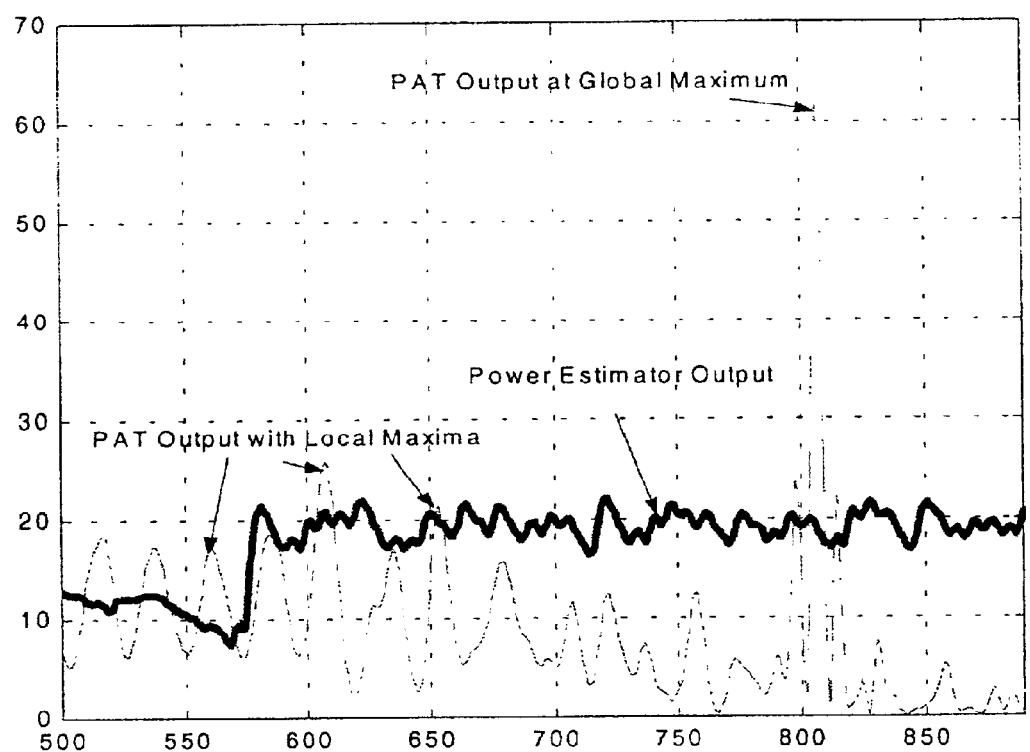
FIG. 9 is a diagram showing a power estimator output and a packet arrival time estimate output, in accordance with the invention.

FIG. 9 is a diagram showing a power estimator output and a packet arrival time estimate output, in accordance with the invention. FIG. 9 shows the output of packet arrival time detector 142 having many local maximums as well as a global maximum. The output of power estimator 170 exhibits an increase of 10 dB when receiver 130 begins receiving a signal from channel 150. Packet arrival time detector 142 easily detects this increase in the power estimate and uses the duration of the increased power estimate as a window to validate its calculated packet arrival times. By ignoring all packet arrival time outputs that occur outside of this window, packet arrival time detector 142 has a lower sensitivity to false alarms and is more robust.

The invention has been described above with reference to specific embodiments. It will, however, be evident that various modifications and changes may be made thereto without departing from the broader spirit and scope of the invention as set forth in the appended claims. The foregoing description and drawings are, accordingly, to be regarded in an illustrative rather than a restrictive sense.

What is claimed is:

1. A system for packet arrival time detection, comprising:
   a receiver configured to receive a signal;
   a packet arrival time detector, coupled to the receiver, configured to produce a packet arrival time output; and
   a power estimator, coupled to the receiver, configured to estimate the power in the received signal and provide the estimated power to the packet arrival time detector to validate the packet arrival time output.

2. The system of claim 1, wherein the power estimator includes a squaring device configured to square the received signal to produce the estimated power of the received signal.

3. The system of claim 2, wherein the power estimator includes a bandpass filter configured to filter the received signal and to provide the filtered received signal to the squaring device.

4. The system of claim 2, wherein the power estimator includes a lowpass filter configured to filter the output of the squaring device to produce a filtered power estimate of the received signal.

5. The system of claim 1, wherein the power estimator includes a Hilbert transform configured to produce an analytic signal comprising a real component and an imaginary component.

6. The system of claim 5, wherein the real component of the analytic signal is the received signal and the imaginary component of the analytic signal is the quadrature signal of the received signal.

7. The system of claim 5, wherein the power estimator includes a bandpass filter configured to filter the received signal and to provide the filtered received signal to the Hilbert transform.

8. The system of claim 7, wherein the bandpass filter is configured to have a frequency response with notches at frequencies where narrow band interference is present.

9. The system of claim 5, wherein the power estimator includes a first squaring device configured to square the real component of the analytic signal, a second squaring device configured to square the imaginary component of the analytic signal, and an adder configured to add the squared real component and the squared imaginary component to produce the estimated power.

10. The system of claim 8, wherein the power estimator includes a lowpass filter configured to filter the sum from the adder to produce a filtered estimated power.

11. The system of claim 1, wherein the packet arrival time detector is configured to detect an increase in the estimated power that indicates a packet is being received by the receiver.

12. The system of claim 11, wherein the increase in the estimated power is about ten decibels.

13. A method for packet arrival time detection, comprising the steps of:
   receiving a signal;
   processing the received signal to produce a packet arrival time output;
   processing the received signal to produce an estimated power; and
   validating the packet arrival time output using the estimated power.

14. The method of claim 13, wherein the step of processing the received signal to produce an estimated power includes squaring the received signal.

15. The method of claim 13, wherein the step of processing the received signal to produce an estimated power includes bandpass filtering the received signal and squaring the bandpass-filtered received signal.

16. The method of claim 15, wherein the step of processing the received signal to produce an estimated power further includes lowpass filtering the squared bandpass-filtered received signal to produce the estimated power.

17. The method of claim 13, wherein the step of processing the received signal to produce an estimated power includes Hilbert transforming the received signal to produce an analytic signal with a real component and an imaginary component.

18. The method of claim 17, wherein the real component of the analytic signal is the received signal and the imaginary component of the analytic signal is a quadrature signal of the received signal.

19. The method of claim 18, wherein the quadrature signal of the received signal is a Hilbert transform of the received signal.

20. The method of claim 17, wherein the step of processing the received signal to produce an estimated power includes bandpass filtering the received signal and providing the filtered received signal to the Hilbert transform.

21. The method of claim 20, wherein the bandpass filtering of the received signal removes narrow band interference.

22. The method of claim 17, wherein the step of processing the received signal to produce an estimated power includes squaring the real component of the analytic signal, squaring the imaginary component of the analytic signal, and adding the squared real component of the analytic signal and the squared imaginary component of the analytic signal.

23. The method of claim 22, wherein the step of processing the received signal to produce an estimated power further includes lowpass filtering the sum of the squared real and imaginary components of the analytic signal to produce the estimated power.

24. The method of claim 13, wherein the step of validating the packet arrival time output includes detecting an increase in the estimated power that indicates that a packet is being received.

25. The method of claim 24, wherein the increase in the estimated power is about ten decibels.

26. The method of claim 24, wherein the increase in the estimated power defines a window during which the packet arrival time output is considered valid.

27. A system for packet arrival detection, comprising:
   means for receiving a signal;
   means for processing the received signal to produce a packet arrival time output;
   means for processing the received signal to produce an estimated power; and
   means for validating the packet arrival time output using the estimated power.

28. A system for packet arrival time detection, comprising:
   a receiver configured to receive a signal;
   a packet arrival time detector, coupled to the receiver, configured to produce a packet arrival time output;
   a power estimator, coupled to the receiver, configured to determine an estimated power of the received signal and to provide the estimated power to the packet arrival time detector to validate the packet arrival time output, where the power estimator generates an analytic signal including a real component equal to the received signal and an imaginary component equal to a Hilbert transform of the received signal, and the power estimator squares the real and imaginary components of the analytic signal and adds together the squared real and imaginary components of the analytic signal to produce the estimated power.

29. The system of claim 28, wherein the power estimator bandpass filters the received signal to remove narrow band interference prior to generating the analytic signal.

30. The system of claim 29, wherein the power estimator lowpass filters the estimated power prior to providing the estimated power to the packet arrival time detector.

* * * * *